(12) United States Patent
Huang

(10) Patent No.: US 7,273,118 B2
(45) Date of Patent: Sep. 25, 2007

(54) ELECTRIC WHEELCHAIR FRAME

(76) Inventor: Shao-Shih Huang, 5F, No. 9, Lane 180, Tong Hua St., Da Ann Dist., Taipei (TW)

( * ) Notice: Subject to any disclaimer, the term of this patent is extended or adjusted under 35 U.S.C. 154(b) by 254 days.

(21) Appl. No.: 11/187,972

(22) Filed: Jul. 25, 2005

(65) Prior Publication Data

US 2007/0018418 A1    Jan. 25, 2007

(51) Int. Cl.
*B60K 1/00* (2006.01)

(52) U.S. Cl. .................. 180/65.1; 180/907; 280/124.1

(58) Field of Classification Search ............... 180/65.1, 180/907, 24.05; 280/250.1, 304.1, 124.1, 280/124.153, 124.111

See application file for complete search history.

(56) References Cited

U.S. PATENT DOCUMENTS

| | | | | |
|---|---|---|---|---|
| 4,840,394 A * | 6/1989 | Bickler | ...................... | 280/677 |
| 5,540,297 A * | 7/1996 | Meier | ........................ | 180/65.5 |
| 5,964,473 A * | 10/1999 | Degonda et al. | ......... | 280/250.1 |
| 6,070,898 A * | 6/2000 | Dickie et al. | ............ | 280/304.1 |
| 6,279,927 B1 * | 8/2001 | Nishihira et al. | ............. | 280/43 |
| 6,312,000 B1 * | 11/2001 | Pauls et al. | .............. | 280/250.1 |
| 6,454,286 B1 * | 9/2002 | Hosino | .................... | 280/250.1 |
| 7,040,429 B2 * | 5/2006 | Molnar | ...................... | 180/65.1 |
| 7,066,290 B2 * | 6/2006 | Fought | ...................... | 180/65.5 |
| 7,175,193 B2 * | 2/2007 | Wu | ......................... | 280/304.1 |

* cited by examiner

*Primary Examiner*—Christopher Bottorff
(74) *Attorney, Agent, or Firm*—Rosenberg, Klein & Lee

(57) ABSTRACT

An electric wheelchair frame includes a seat brace, a pair of connection rods, a pair of front suspension brackets, a pair of rear suspension brackets, and a pair of resilient members. A front section of either side of the seat brace is pivotally connected to the front suspension bracket. A rear section of either side of the seat brace is pivotally connected to the rear suspension bracket. A rear end of the front suspension bracket and a front end of the rear suspension bracket are pivotally connected to the connection rod, respectively. The resilient member has one end connected to the connection rod and another end connected to the rear suspension bracket.

3 Claims, 4 Drawing Sheets

ELECTRIC WHEELCHAIR FRAME

BACKGROUND OF THE INVENTION (a) Field of the Invention

The present invention relates to an electric wheelchair frame, and more particularly, to one that allows a seat brace to firmly advance by having connection rods and resilient members to absorb the bumping from front or rear wheel suspension brackets when traveling on a rough road.

(b) Description of the Prior Art

An electric wheelchair or an electric mobility scooter has become a must for senile people who have trouble to walk around. To make the riding more comfortable, a wheelchair frame usually comprises two main wheels transmitted by a motor at both sides of a seat brace, and front and rear suspension brackets are respectively disposed before and behind the seat brace to be pivoted to corresponding front wheels and rear wheels for the wheelchair to ride safely on a rough road. For a certain wheelchair, both the front and the rear suspension brackets are further provided with absorbers to help the rider feel more comfortable.

However, the seat brace and both front and rear suspension brackets are fixed to one another, meaning that the seat brace bumps on the rough road even with the presence of the absorbers. The seat brace tends to incline against the level of the ground to make its rider uncomfortable.

Furthermore, for safety concerns, the central gravity of the body of the wheelchair is designed to get closer to the rear wheels once the seat brace takes the load of the rider. As a result, the front wheels often slightly lift up from the ground to make the rider feel uneasy.

SUMMARY OF THE INVENTION

The primary purpose of the present invention is to provide an electric wheelchair frame to keep the wheelchair firmly traveling even on a rough road so that its user could feel safe, easy and comfortable.

To achieve the purpose, the present invention includes a seat brace, a pair of connection rods, a pair of front suspension brackets, a pair of rear suspension brackets, and a pair of resilient members. The front section of either side of the seat brace is pivotally connected to the middle section of the front suspension bracket. The rear section of either side of the seat brace is pivotally connected to the middle section of the rear suspension bracket. The front end of the front suspension bracket is pivotally connected with a front wheel, and the rear end of the front suspension bracket is pivotally connected to the lower end of the connection rod. The middle section of the connection rod is pivotally connected with the front end of the rear suspension bracket. The upper end of the connection rod is pivotally connected with one end of the resilient member. The rear end of the rear suspension bracket is pivotally connected with a rear wheel. The lower part of the front section of the rear suspension bracket is pivotally connected with a main wheel, and the upper part of the front section of the rear suspension bracket is pivotally connected with another end of the resilient member.

DETAILED DESCRIPTION OF THE PREFERRED EMBODIMENTS

Figure 1:
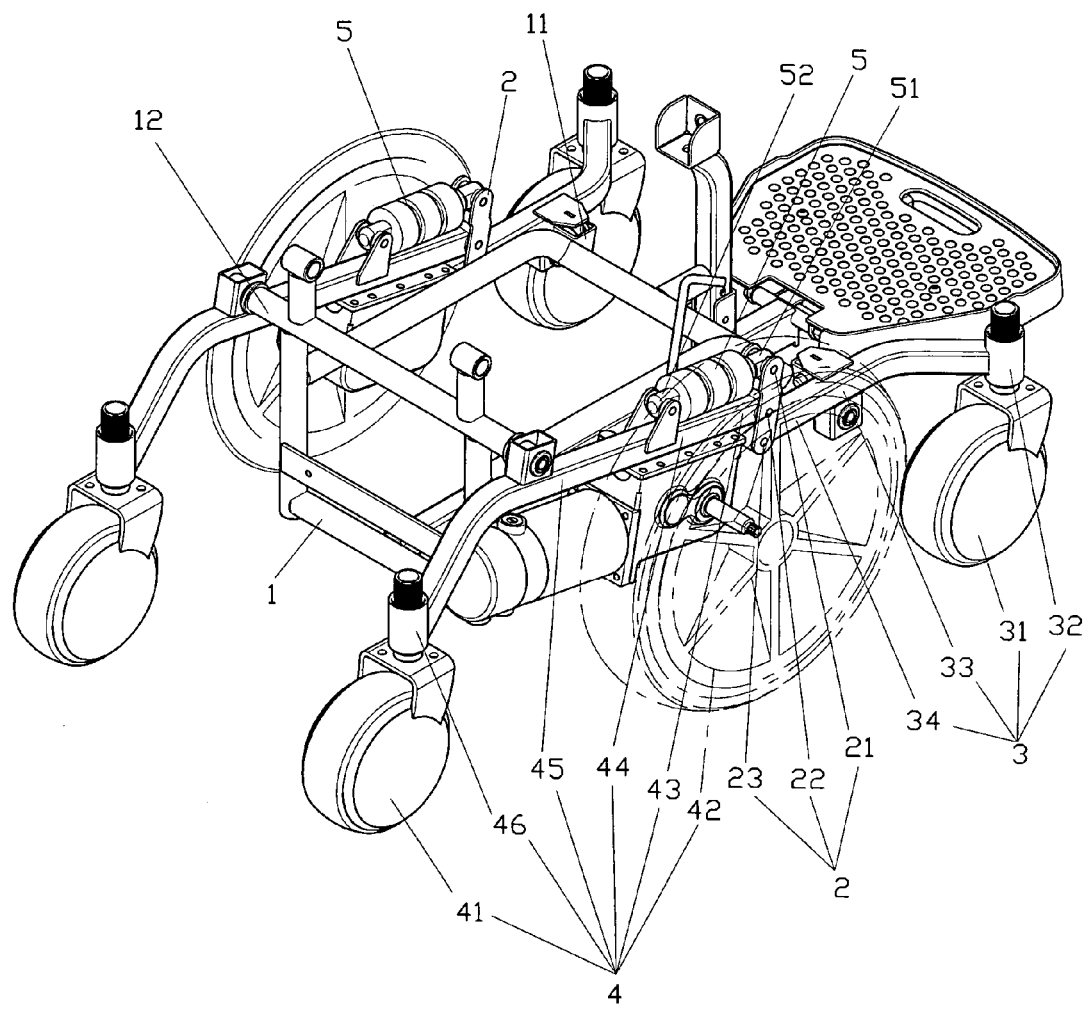
FIG. 1 is a perspective view of the present invention.
Figure 2:
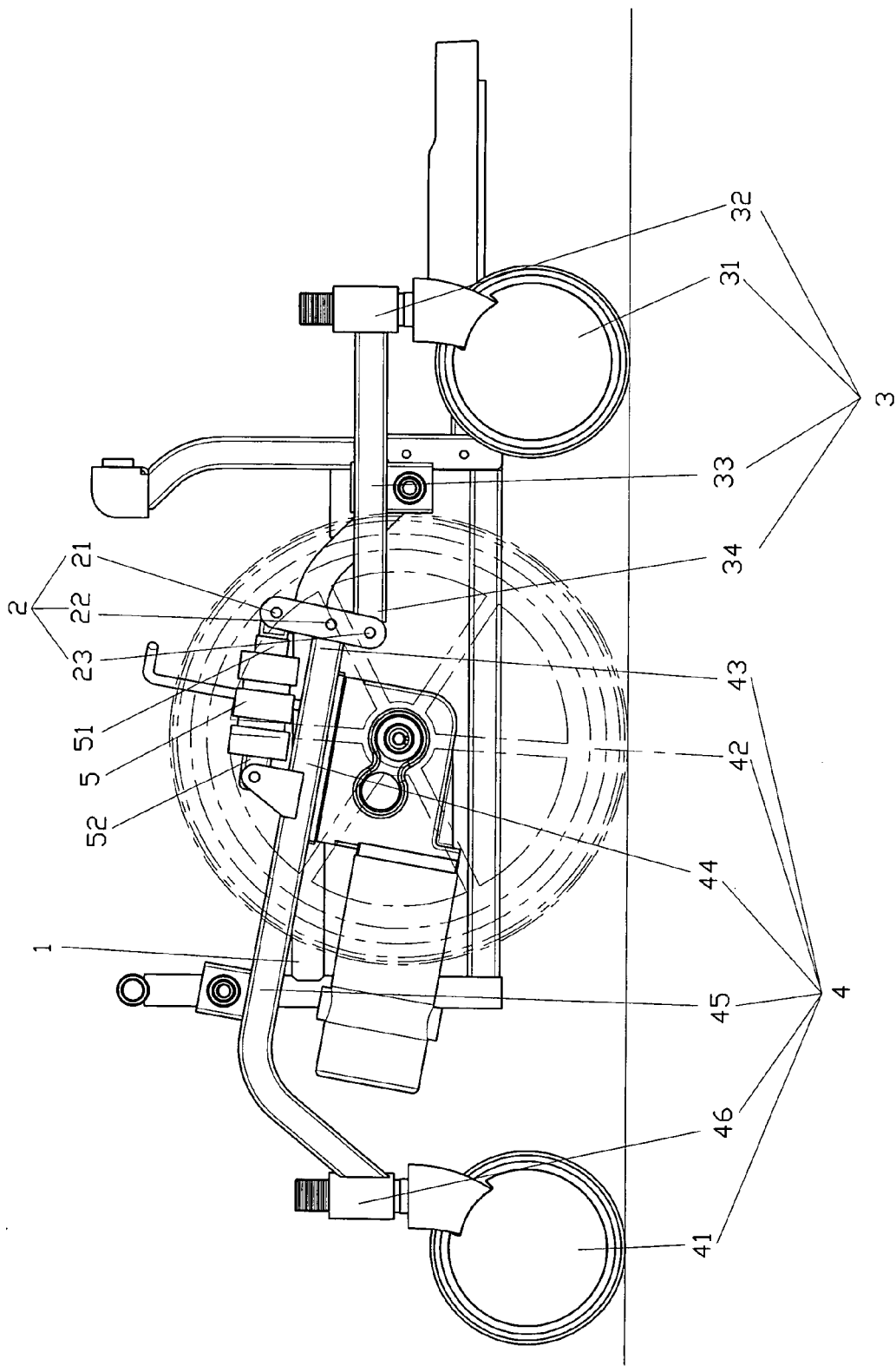
FIG. 2 is a side view of the present invention as assembled.

Referring to FIGS. 1 and 2, a preferred embodiment of the present invention comprises a seat brace (1), a pair of connection rods (2), a pair of front suspension brackets (3), a pair of rear suspension brackets (4), and a pair of resilient members (5).

Either side of the seat brace (1) includes a front section (11) and a rear section (12).

Each connection rod (2) includes an upper end (21), a middle section (22), and a lower end (23).

Each front suspension bracket (3) includes a front wheel (31), a front end (32), a middle section (33), and a rear end (34).

Each rear suspension bracket (4) includes a rear wheel (41), a main wheel (42), a front end (43), a front section (44), a middle section (45) and a rear end (46).

Each resilient member (5) includes one end (51) and another end (52). In the preferred embodiment, the resilient member is a buffer made of rubber or similar material. It may be an equivalent including a spring, a cylinder, or a hydraulic cylinder.

The front section (11) of either side of the seat brace (1) is pivotally connected to the middle section (33) of the front suspension bracket (3). The rear section (12) of either side of the seat brace (1) is pivotally connected to the middle section (45) of the rear suspension bracket (4). The front end (32) of the front suspension bracket (3) is pivotally connected with the front wheel (31). The rear end (34) of the front suspension bracket (3) is pivotally connected to the lower end (23) of the connection rod (2). The middle section (22) of the connection rod (2) is pivotally connected with the front end (43) of the rear suspension bracket (4). The upper end (21) of the connection rod (2) is pivotally connected to the end (51) of the resilient member (5). The rear end (46) of the rear suspension bracket (4) is pivotally connected with the rear wheel (41). The lower part of the front section (44) of the rear suspension bracket (4) is pivotally connected with the main wheel (42). The upper part of the front section (44) of the rear suspension bracket (4) is pivotally connected with the other end (52) of the resilient member (5).

Figure 3:
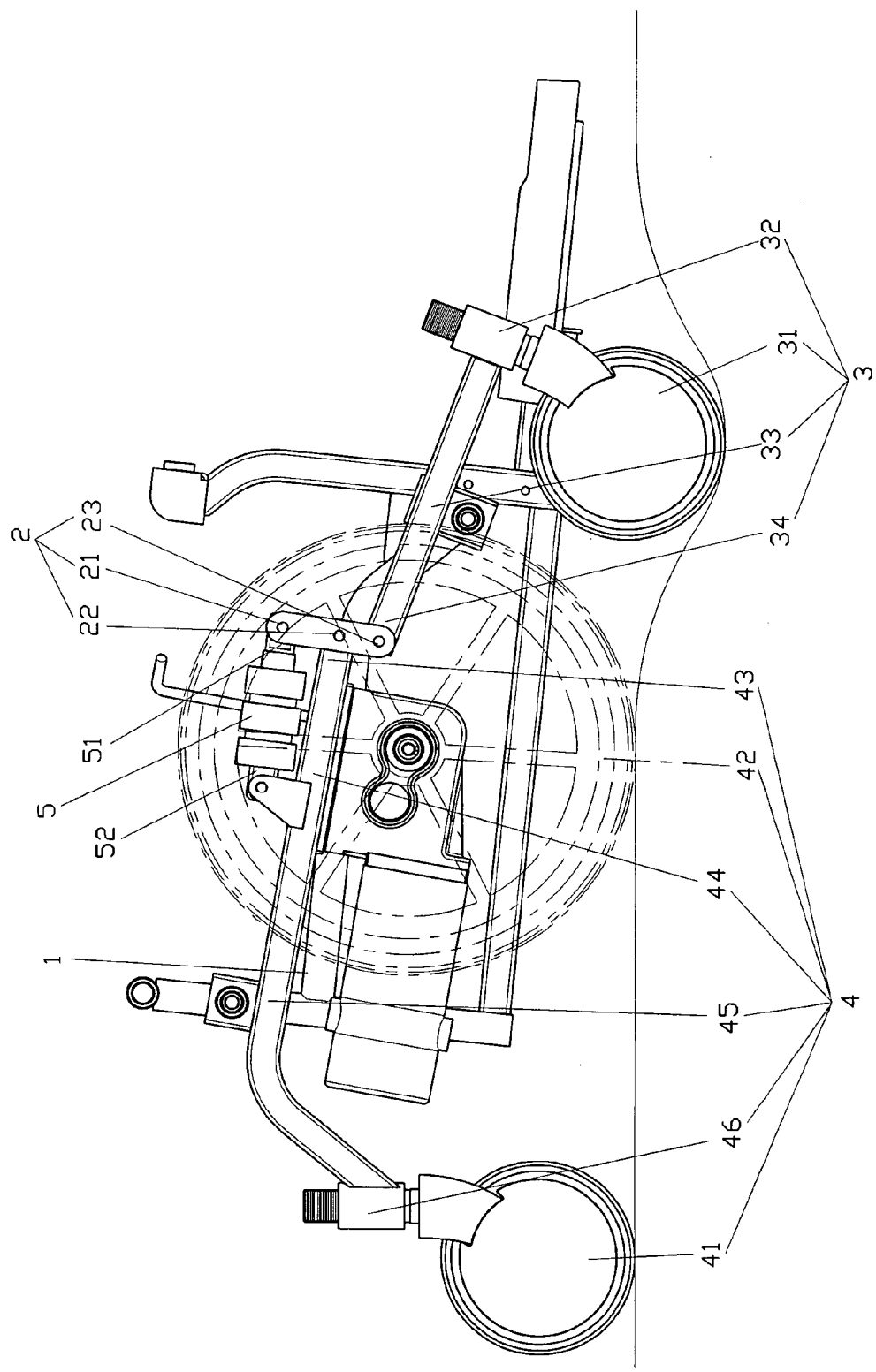
FIG. 3 is a schematic view showing an operation status of the present invention.
Figure 4:
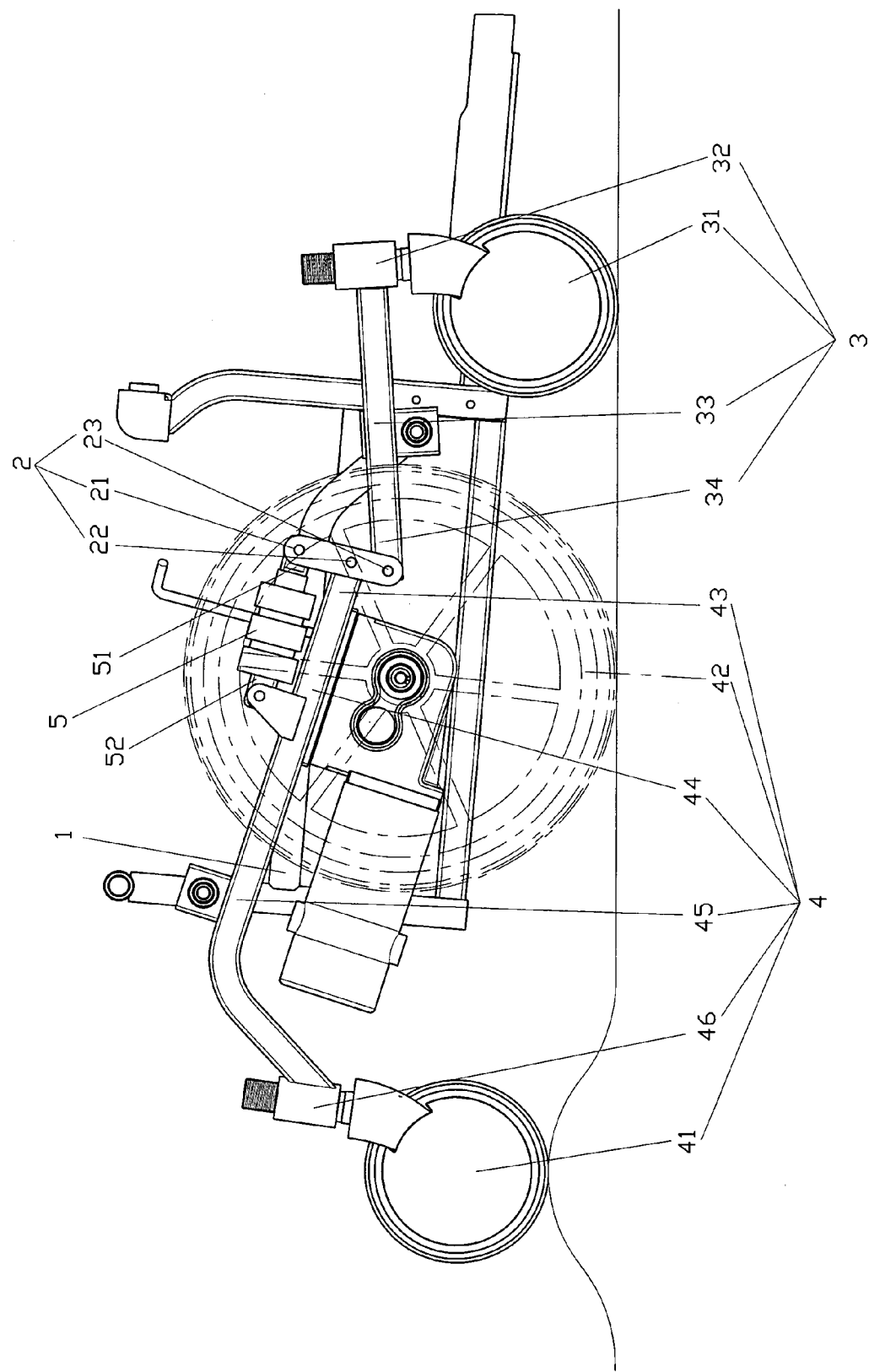
FIG. 4 is a schematic view showing another operation status of the present invention.

In case of a bumpy road as illustrated in FIGS. 3 and 4, the main wheel (42) and the rear wheel (41) constantly contact the ground due to that the gravity center of the wheelchair, while the front wheel (31) of the front suspension bracket (3) also constantly contacts the ground since both the front suspension bracket (3) and the rear suspension bracket (4) are respectively pivoted to the seat brace (1). Accordingly, the rear end of the front suspension bracket (3) and the front end of the rear suspension bracket (4) compress the resilient member (5), and the resilient member (5) in turn fully absorbs the oscillation exercised by the front suspension bracket (3) or the rear suspension bracket (4) to permit the seat brace (1) to be kept in a leveled status as were the wheelchair is driving on a flat ground for the rider to feel safe, firm and comfortable in the wheelchair.

What is claimed is:

1. An electric wheelchair frame comprising a seat brace, a pair of connection rods, a pair of front suspension brackets, a pair of rear suspension brackets, and a pair of resilient members;

either side of the seat brace including a front section and a rear section;
each connection rod including an upper end, a middle section, and a lower end;
each front suspension bracket including a front wheel, a front end, a middle section, and a rear end;
each rear suspension bracket including a rear wheel, a main wheel, a front end, a front section, a middle section and a rear end;
each resilient member including two ends;
whereby the front section of either side of the seat brace being pivotally connected to the middle section of the front suspension bracket, the rear section of either side of the seat brace being pivotally connected to the middle section of the rear suspension bracket, the front end of the front suspension bracket being pivotally connected with the front wheel, the rear end of the front suspension bracket being pivotally connected to the lower end of the connection rod, the middle section of the connection rod being pivotally connected with the front end of the rear suspension bracket, the upper end of the connection rod being pivotally connected with one end of the resilient member, the rear end of the rear suspension bracket being pivotally connected with the rear wheel, a lower part of the front section of the rear suspension bracket being pivotally connected with the main wheel, an upper part of the front section of the rear suspension bracket being pivotally connected with the other end of the resilient member.

2. The electric wheelchair frame of claim 1, wherein the resilient member is a buffer.

3. The electric wheelchair frame of claim 2, wherein the buffer is made of rubber.

* * * * *